United States Patent [19]

Senoo et al.

[11] Patent Number: 5,448,475
[45] Date of Patent: Sep. 5, 1995

[54] WORD PROCESSING APPARATUS WITH HANDWRITING INPUT FUNCTION

[75] Inventors: Seiichi Senoo, Shiki; Yukihiko Ueno, Soraku; Kentaro Hama, Kyoto, all of Japan

[73] Assignee: Sharp Kabushiki Kaisha, Osaka, Japan

[21] Appl. No.: 151,864

[22] Filed: Nov. 15, 1993

[30] Foreign Application Priority Data

| Nov. 18, 1992 | [JP] | Japan | 4-309068 |
| Nov. 18, 1992 | [JP] | Japan | 4-309069 |
| Nov. 18, 1992 | [JP] | Japan | 4-309070 |

[51] Int. Cl.⁶ .............................................. G06F 17/24
[52] U.S. Cl. .......................... 364/419.1; 364/419.17; 382/187; 345/173
[58] Field of Search ................. 364/419.1, 419.17; 382/9, 13, 59; 340/706-708

[56] References Cited

U.S. PATENT DOCUMENTS

| 4,727,588 | 2/1988 | Fox et al. | 382/9 |
| 5,038,382 | 8/1991 | Lipscomb | 382/13 |
| 5,049,862 | 9/1991 | Dao et al. | 340/706 |
| 5,157,737 | 10/1992 | Sklarew | 382/13 |

FOREIGN PATENT DOCUMENTS

| 51-93830 | 8/1976 | Japan . |
| 61-226869 | 10/1986 | Japan . |
| 62-28828 | 2/1987 | Japan . |
| 62-256023 | 11/1987 | Japan . |
| 3-25577 | 2/1991 | Japan . |
| 3-150625 | 6/1991 | Japan . |

OTHER PUBLICATIONS

Hardock, "Design Issues for Line-Driven Text Editing/Annotation Systems", Graphics Interface '91, 3 Jun. 1991, pp. 77-84.
Patent Abstracts of Japan, vol. 13, No. 499 (P-957) 10 Nov. 1989 & JP-A-01 200 468 (Fujitsu), 11 Aug. 1989.
Goldberg et al, "Stylus User Interfaces for Manipulating Text", Proceeding of the ACM Symposium on User Interface Software and Technology, 11 Nov. 1991, S.C. USA, pp. 127-135.

Primary Examiner—Gail O. Hayes
Assistant Examiner—Frantzy Poinvil
Attorney, Agent, or Firm—Nixon & Vanderhye

[57] ABSTRACT

A word processing apparatus includes a document data memory, a display, a handwriting input unit for handwriting an edition symbol onto a data portion of the displayed document data, a count unit for counting an address of the handwritten edition symbol in the document data memory, a recognition unit for recognizing the handwritten edition symbol, an edition symbol memory for storing a plurality edition symbols recognized and their addresses, and an edition processor for successively editing a plurality of handwritten data portions in accordance with the recognized edition symbols and their addresses.

3 Claims, 21 Drawing Sheets

FIG. 3

| Registration number | Name of editing symbol | Scope of editing | | Image storing position | | Relation with other symbols |
|---|---|---|---|---|---|---|
| | | Head position | Length | Head position | Length | |
| 001 | Return | x7, y1 | 1 | a1 | l1 | None |
| 002 | Space | x8, y1 | 6 | a2 | l2 | None |
| 003 | One character deletion | x5, y1 | 1 | a3 | l3 | None |

FIG. 4

| Editing mode | Processing mode | Recognition confirmation | Reconfirmation means | Order of processing |
|---|---|---|---|---|
| Indirect = 0<br>Direct = 1 | Batch processing = 0<br>Individual processing = 1 | Required = 0<br>Unrequired = 1 | Display = 0<br>Sound = 1 | Display order = 0<br>Symbol order = 1<br>Input order = 2 |
| Return level<br>Continuation = 1<br>Interruption = 2 | Space level<br>Continuation = 1<br>Interruption = 2 | One character deletion level<br>Continuation = 1<br>Interruption = 2 | TAB Level<br>Continuation = 1<br>Interruption = 2 | Region level<br>Depending on other symbol = 0 |
| Return order<br>3 | Space order<br>2 | One character deletion order<br>1 | TAB Order<br>4 | Region order<br>Depending on other symbol = 0 |

F I G . 5

| Setting editing symbols | | | |
|---|---|---|---|
| Editing mode | Indirect editing | Direct editing | |
| Processing mode | Batch processing | Individual processing | |
| Recognition confirmation | Required | Unrequired | |
| Reconfirmation means | Display | Sound | |
| Processing order | Display order | Symbol order | input order |

| Setting recognition level | Setting symbol order | |
|---|---|---|
| | | |

FIG. 7

Setting recognition level

| | | |
|---|---|---|
| Return | Continuation | Interruption |
| Space | Continuation | Interruption |
| One character deletion | Continuation | Interruption |
| TAB | Continuation | Interruption |
| Region | Depending on other symbol | |

FIG. 8

Setting symbol order

| | |
|---|---|
| Return | 2 |
| Space | 3 |
| One character deletion | 1 |
| TAB | 4 |
| Region | Depending on other symbol |

⏎ First pen input operation
___ Second pen input operation
𝒴 Third pen input operation ⏎ First execution ___ Second execution 𝒴 Third execution — Symbol "⌐" is blinked or number in symbol "☐" is inverted Return symbol is subsequently processed — Message is displayed — Symbol "⌐" is blinked or number in symbol "☐" is inverted ⏎ First pen input operation
└── Second pen input operation
ɣ Third pen input operation ɣ One character deletion execution └── Space execution ⏎ Return execution ⌋ First pen input operation
└─ Second pen input operation
ℊ Third pen input operation ℊ One character deletion execution ⌋ Return execution └─ space execution

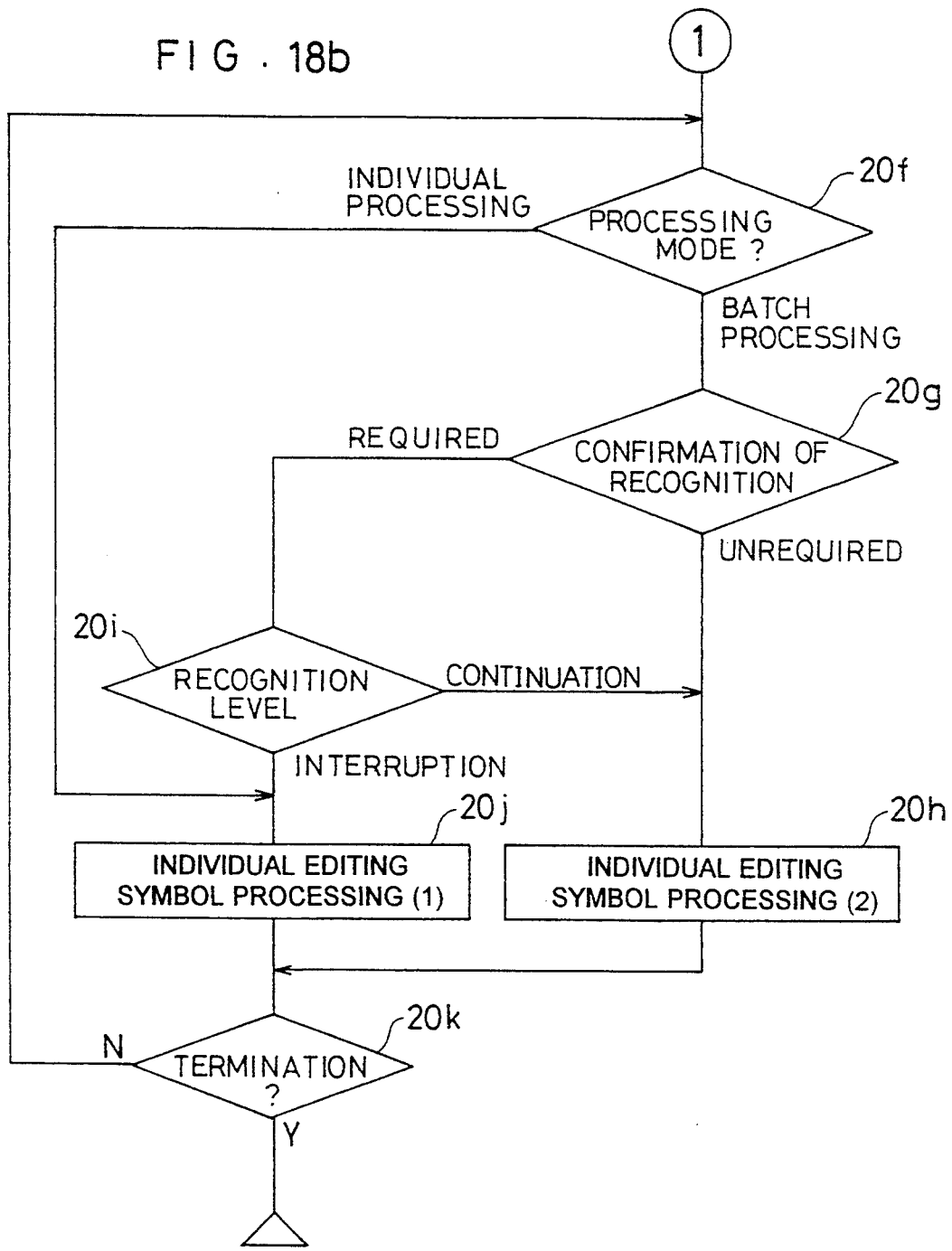

FIG. 21 PRIOR ART
| Editing symbol | Operation |
|---|---|
|  | Return is entered |
| 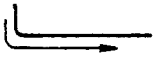 | Space is entered |
|  | One character deletion is entered |
|  | TAB is entered |
| 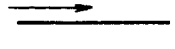 | Region is entered |

Edition symbol of return "⌐" is entered

Edition symbol of space "⌴" is entered

Edition symbol of one character deletion "⍺" is entered

WORD PROCESSING APPARATUS WITH HANDWRITING INPUT FUNCTION

BACKGROUND OF THE INVENTION

1. Field of the Invention

The present invention relates to word processing apparatus such as word processors and computers capable of preparing documents. More particularly the invention relates to a word processing apparatus with a handwriting input function that allows a handwriting input operation.

2. Description of the Related Art

Word processors which have both a display unit and an integrated tablet input unit are conventionally known as pen input word processors. Examples of word processors which use a table input unit to enter editing symbols for editing documents are disclosed in Japanese Laid-Open Patent No. SHO 61-226869 and Japanese Laid-Open Patent No. HEI 3-25577.

FIG. 20 shows a functional block diagram of such a conventional pen input word processing apparatus. Referring to FIG. 20, reference numeral 31 designates an application memory unit in which each kind of application program is stored, 32 a system control unit that performs data processing based on the application stored in the application program(s) memory unit 31, 33 a key driver that receives a key input from a keyboard, 34 a pen driver that receives a pen input from the tablet, 35 a pen input control unit that receives track data of the tablet pen transmitted from the pen driver 34 to control the track data based on the instruction from the system control unit 32, 36 a display driver that receives a track image of the pen output from the pen input control unit and is controlled by the system control unit 32 to control the display, 37 an engine for recognizing a handwritten symbol that recognizes what symbol is formed by the pen track by receiving track data from the pen input control unit 35 and comparing the data thus received with each kind of character and symbol pattern stored in advance.

Such conventional pen input word processing apparatus edits documents with a handwriting input of editing symbols as shown in FIG. 21 using a tablet pen.

Such editing symbols are determined in the following way.

"Return"—a handwriting symbol for moving down from an upper line and then travelling further to the left.

"Space"—a a handwriting symbol for moving down from an upper line and then travelling further to the right, the amount of space thereof being determined by the length to the travel to the right side."

"One character deletion"—a handwriting symbol for moving up from a lower line while making a circle.

"TAB"—a handwriting symbol for moving up from the lower line to the upper line and then travelling further to the right.

"Region"—a handwriting symbol for moving from the left to the right, the amount of region being determined by the length of the travel to the right. Incidentally using a combination of "one character deletion" and "region" allows the definition of region deletion.

FIGS. 22a through 22f are views for illustrating examples of processing such editing symbols. For example, the input of the return key provides an editing of documents as shown in FIG. 22b. The input of an editing symbol "space" with a tablet pen as shown in FIG. 22c provides an editing of documents as shown in FIG. 22d. The input of "one character deletion"—with the tablet pen provides an editing of documents as shown in FIG. 22e.

Editing operation by handwriting symbols using a tablet pen has been done as mentioned above according to the conventional method.

However, in the application of these editing symbols, the conventional key input is simply replaced by the pen. There is no feature peculiar to the pen input operation displayed therein. In other words, such input operation has a drawback that processing documents using such editing symbols is does not substantially differ from the ordinary processing by the conventional method in which documents are processed successively, so that it is very difficult to see the context thereof, which in turn makes it very hard to operate the pen input function of this kind.

Besides, assuming that a wrong editing symbol is entered or such wrong symbol is recognized, the movement of symbols on the display screen is too rapid in a successive processing of editing symbols based on the result of the recognition with the result that it takes time to comprehend the content of editing.

As related art of the present invention, Japanese Laid-Open Patent. No. SHO 51-93830 discloses a control instruction apparatus which allows a pen to enter continuous coordinates like a line drawn with one stroke of a brush to detect the order of element regions where coordinates (drawn with one stroke of a brush thereby corresponding to the control instruction.

Japanese Laid-Open Patent No. SHO 62-28828 discloses a tablet input data processing apparatus that offers simultaneously characters/positions to be edited and editing instructions by entering specific editing symbols to a document displayed on a display integrated tablet through pen input operation.

Japanese Laid-Open Patent No. SHO 62-256023 discloses a tablet input data processing apparatus comprising an instruction input system that improves the operability of such work as editing and proof-reading a document by determining from a set of operation position relative to the touch operation the pattern of instruction and a region where the instruction is executed.

Japanese Laid-Open Patent No. HEI 3-150625 discloses a tablet input data processing apparatus comprising an instruction input system that allows an easy input of a plurality of instruction by constituting mutually corresponding instructions into the same pattern and differentiating the direction (stroke) of writing each different instruction.

SUMMARY OF THE INVENTION

The present invention provides a word processing apparatus that can easily modify editing in the midway and decrease an error in operation owing to a mistaken instruction of editing symbol and a wrong recognition of editing symbol by providing buffer means for storing editing symbols so that editing can be performed while comprehending the process of editing with a method that can facilitate the confirmation of the result of editing.

Accordingly the present invention provides a word processing apparatus with a handwriting input function, comprising data memory for storing data, display means for displaying the data stored in the data memory, handwriting input means for handwriting at least an editing symbol onto a data portion of the displayed data, count means for counting an address of the handwritten editing symbol in the data memory, recognition means for recognizing the handwritten editing symbol by referring to patterns of editing symbols stored therein editing symbol memory for storing a plurality of editing symbols recognized by the recognition means and their addresses, and editing processing means for successively editing a plurality of handwritten data portions in accordance with the recognized editing symbols and their addresses.

According to the invention, the editing symbol recognized by recognition means is stored in the editing symbol memory in the amount of a plurality of editing symbols. Then the editing processing means successively edits a plurality of handwritten data portions in accordance with the recognized editing symbols and their addresses. Consequently after performing all the instructions for editing, the editing processing corresponding to the instruction is successively effected. This improves the efficiency of editing operation.

BRIEF DESCRIPTION OF THE DRAWINGS

The present invention will be further detailed in conjunction with the accompanying drawing in which;

FIG. 3 is a view illustrating the memory content in the memory storing editing symbols;

FIG. 4 is a view illustrating the memory content in the conditional flag region;

FIG. 5 is a view illustrating a screen showing a menu for setting editing symbols.

FIG. 7 is a view for illustrating a screen displaying a @D menu for setting a recognition level.

FIG. 8 is a view for illustrating a screen displaying a menu for setting the order of symbols.

FIGS. 18a and 18b are a flow chart illustrating the processing content in the entire embodiment.

FIG. 21 is a view illustrating an example of editing symbols by handwriting input.

DESCRIPTION OF THE PREFERRED EMBODIMENTS

Preferred embodiments of the present invention will be detailed hereinbelow. However, the present invention is not limited by the preferred embodiments.

The present invention can be applied to many kinds of Japanese word processors and English word processors both small and large.

There will be explained hereinbelow an embodiment of the present invention which is applied to a Japanese-word processor with a tablet input function. The application of the present invention can be performed by adding the following function of the present invention to a Japanese word processor.

In accordance to the present invention, data to be stored in the data memory only has to include document data. It may also include different kinds of data such as numerical data, graphic data and image data.

Figure 1:
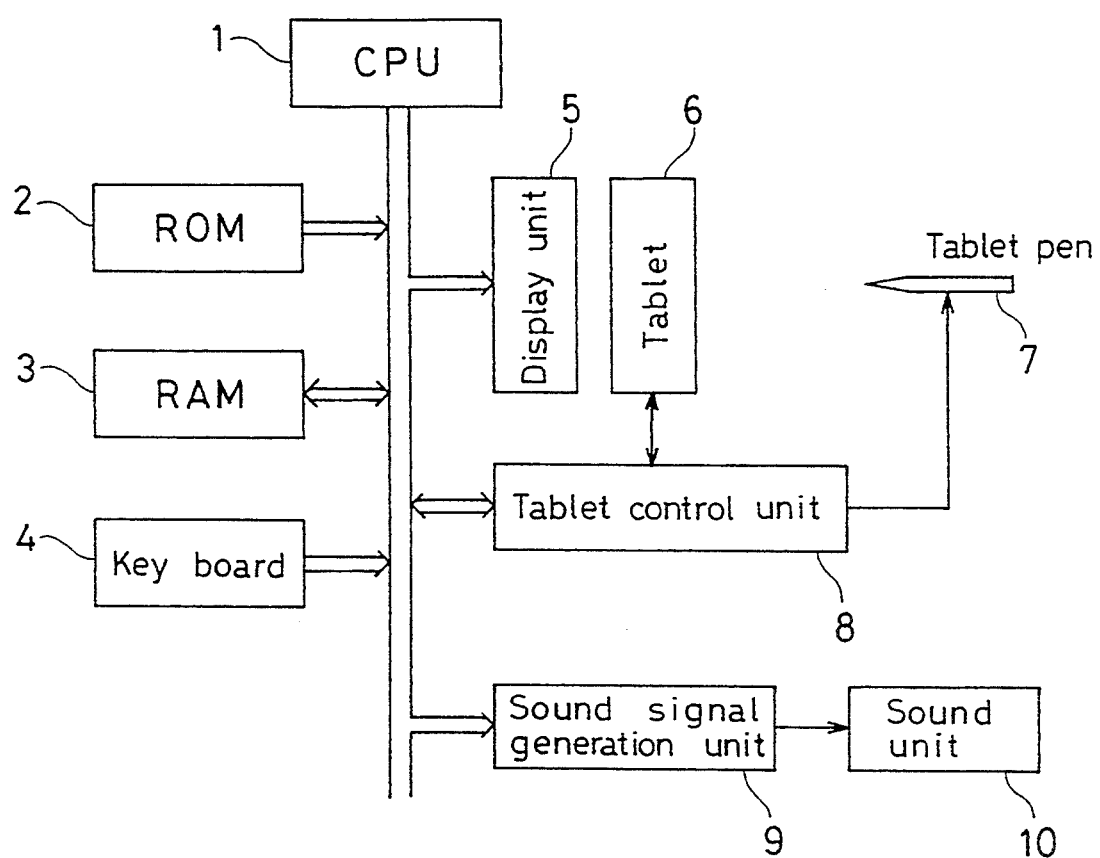
FIG. 1 is a block diagram illustrating the construction of one embodiment in which the present invention is applied to a Japanese word processor.

FIG. 1 is a block diagram illustrating the construction of a Japanese word processor provided with a tablet input function. Referring to FIG. 1, reference numeral 1 designates a central processing unit (CPU) that performs data processing with a control program written in a read only memory (ROM) 2.

Reference numeral 3 designates a random access memory (RAM), 4 a kana character key, a kana-kanji conversion key, or a keyboard providing function keys, 5 a display unit comprising a CRT display device or a LC display device, 6 a tablet integrated with the display unit 5, 7 a tablet pen for handwriting document data onto the tablet 6, 8 a tablet control unit for controlling the tablet pen 7, 9 a sound signal generation unit for outputting a sound signal, 10 a sound generation unit for generating a sound upon receipt of an output signal from the sound signal generation unit 9.

Figure 2:
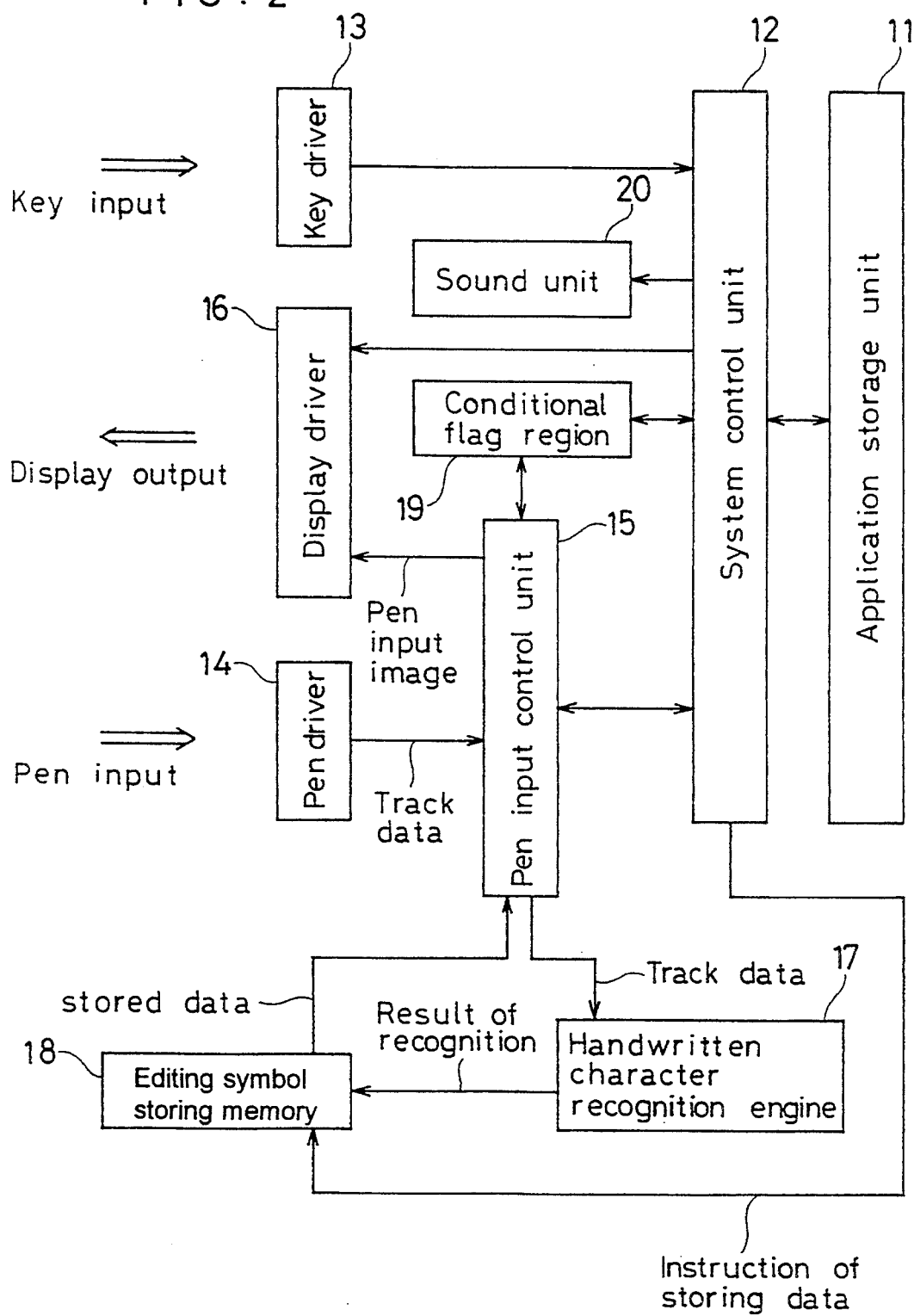
FIG. 2 is a function block diagram in one embodiment of the present invention.

FIG. 2 is a functional block diagram of an embodiment of the present invention. Referring to FIG. 2, reference numeral 11 designates an application storage unit, 12 a system control unit for processing data based on an application stored in the application storage unit 11, 13 a key driver for receiving key input from the keyboard 4, 14 a pen driver for receiving track data of the tablet pen 7, 15 a pen control unit that receives the track data of the tablet pen 7 from the pen driver 14 and controls the track data based on the instruction given by the system control unit 15, and 16 a display driver that receives the pen input image output from the pen control unit 15 and receives the control from the system control unit 12 to control the display unit 5.

Reference numeral 17 designates a handwritten character recognition engine that recognizes what character or symbol the pen track stands for by receiving the track data of the pen from the pen control unit 15 and comparing the data with prestored patterns of character and symbol of each kind, and 18 an editing symbol storing memory that receives the result of recognition from the handwritten character recognition engine 17 so that when it has been made clear that the track data provides editing symbols, the editing symbols are accumulated and stored by a portion of a plurality of editing symbols and stores the editing position corresponding to each editing symbol.

Reference numeral 19 designates a conditional flag region that stores processing conditions of editing symbol stored in the editing symbol storing memory 18, 20 a sound unit that generates a sound upon receiving an instruction from the system control unit 12, the unit 20 corresponding to the sound unit shown in FIG. 3.

As can be seen from FIG. 2, the present invention comprises an editing symbol storing memory 18, a conditional flag region 19 given as a means of defining the operation of data stored in this editing symbol storing memory 18 and a sound unit 20.

As to hardware construction, both editing symbol storing memory 18 and the conditional flag region 19 are included in RAM 3 shown in FIG. 1. In addition to the apparatus of the present invention to a Japanese word processor (not shown in the drawing) provided with the conventional tablet input means is supplemented with a sound signal generating unit 9 and a sound unit 10 connected to the signal generating unit 9.

FIG. 3 is a view illustrating the memory content stored in the editing symbol storing memory 18. The memory content of the editing symbol storing memory 18 is as shown in FIG. 3. Operation definition items stored in the conditional flag region 19 includes the following items:
 editing method (indirect editing and direct editing)
 processing method (batch processing and individual processing)
 recognition confirmation (required, not required)
 reconfirmation means (display, sound)
 processing order (display order, symbol order and input order)

When confirmation of recognition is required, the recognition level can be determined as operation, termination and dependence. In addition, with respect to the processing order of symbols, the input of sequential numbers and the dependency can be defined.

Then these flags are stored in each flag region 19 as shown in FIG. 4. In this manner, each kind of editing processing is performed by defining each operation condition in the conditional flag region 19.

The tablet input function of the apparatus according to the present invention and the operation of the display is illustrated based on FIG. 3. At the outset, the image entered into the tablet is controlled with the pen input control unit 15, and the track data is displayed on the display unit 5. Then the data is recognized with the handwritten character recognition engine 17. When the recognized data is an editing symbol, it is stored in the editing symbol storing memory 18.

The editing symbol storing memory 18 stores the name of the editing symbol given as a result of recognition and the scope of editing thereof, a pen handwriting input image for overlapping with the editing screen and the input order of editing symbols.

After the recognition of handwritten characters, the display of the pen input image is replaced with the image stored in the editing symbol storing memory 18. This stored memory does not change because it remains the same as long as it is displayed on the same location. When the image is transferred from by scrolling the former editing data, the unprocessed pen input image can be scrolled simultaneously by displaying the image with the replacement data transmitted from the editing symbol storing memory 18.

The conditional flag is used to designate the processing method of editing symbols entered by the pen. When the reconfirmation is made by sound under such conditions, the process is performed through the sound unit 20.

The system control unit 12 is intended for recognizing the pen handwriting input operation with this processing of entering editing symbols with the pen to store the editing symbols in the editing symbol storing memory 18 and to control the display unit 5 and the entire editing processing including the conditional flag control other than the pen input operation. The system control unit 12 performs the control required in applications individually prepared (such as document preparation, graph preparation, drawings preparation and table preparation).

Each processing will be described hereinbelow.

1. Setting an initial condition

An initial condition is set by giving instructions in accordance with an individual method (not described here) predetermined from the keyboard 4 or the tablet pen 6.

Figure 6:
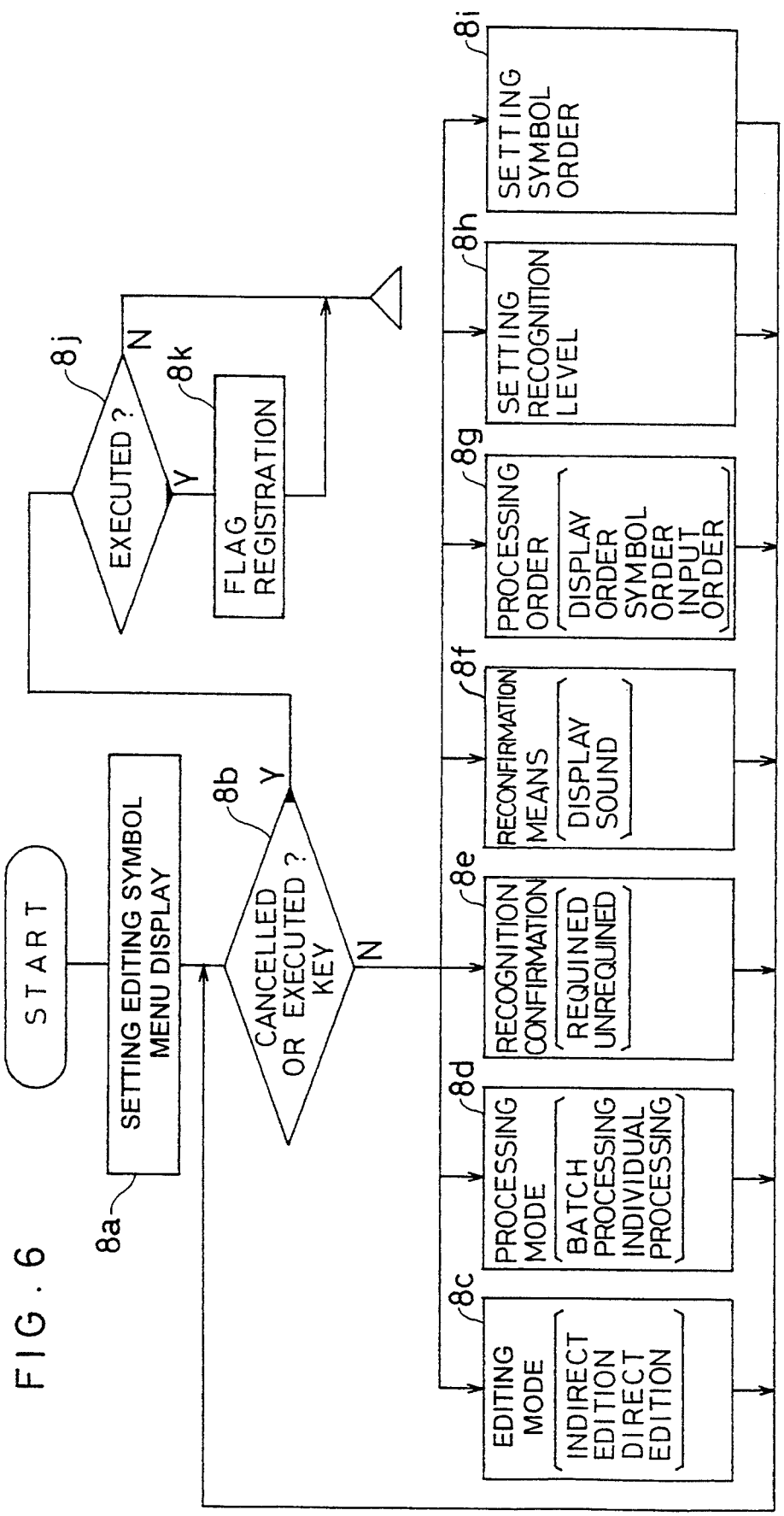
FIG. 6 is a flow chart illustrating the processing content of setting editing symbols.

This allows the screen to set editing symbols as shown in FIG. 5 so that the cursor key mounted in the keyboard 4 can perform the operation as shown in the flowchart of FIG. 6. Then the cancel key and the execution key mounted in the key board determine whether or not the instruction is to be defined. When the instruction is defined, what is shown in FIG. 5 is replaced with what is instructed in the display unit 3.

In other words, in the processing shown in FIG. 6, a menu for setting editing symbols as shown in FIG. 5 is displayed (step 8a) to determine the cancel key and the execution key (step 8b). In the subsequent process, the cursor respectively sets such modes as the editing mode (step 8c), the processing mode (8d), the recognition confirmation (step 8e), the reconfirmation means (step 8f), the processing order (step 8g), the recognition level setting (step 8h), and the symbol order setting (step 8i). When the execution key is pressed (step 8j), each flag is registered (step 8k).

The recognition level is set in a screen showing a menu for setting editing symbols shown in FIG. 5 by designating the level with the pen input operation in the region for setting the editing region or by pressing a key corresponding to the recognition level. Thus the screen shown in FIG. 7 is displayed on the display unit 5 and the operation shown in the flowchart of FIG. 9 is performed.

Figure 9:
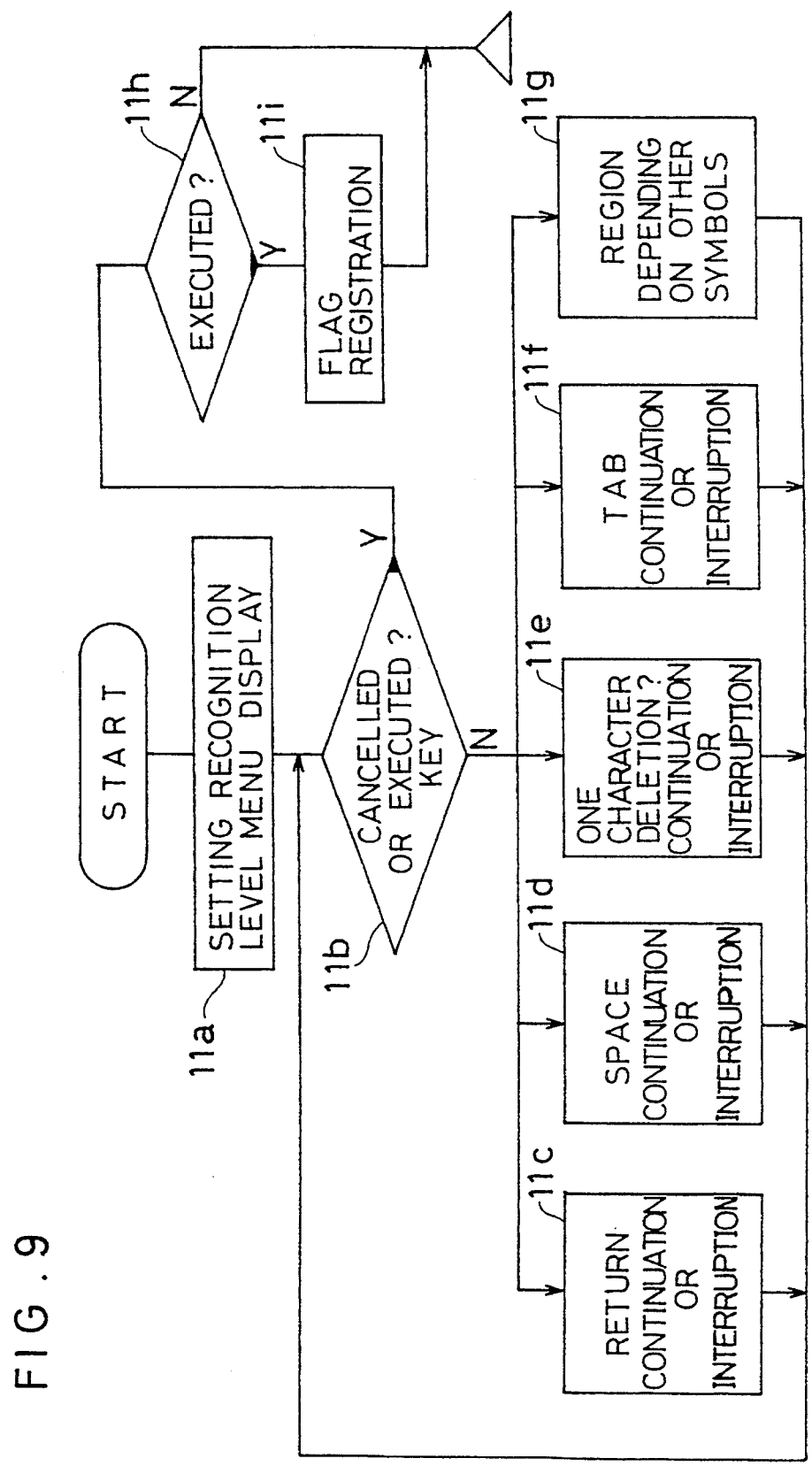
FIG. 9 is a flow chart for illustrating the processing content in setting the recognition level.

In other words, in the processing shown in FIG. 9, a menu for setting the recognition level of FIG. 7 is displayed (step 11a). The cancel key and the execution key are determined (step 11b) followed by setting the continuation or the interruption of return (step 11c), space (step 11d), one character deletion (step 11e), and TAB (step 11f). It is also judged whether or not the operation depends on other operation with respect to the region (step 11g). When the execution key is not pressed (step 11h), each flag is registered (step 11i).

The symbol order is designated with pen input operation in a region for setting the symbol order on a screen showing a menu for setting editing symbols shown in FIG. 5. Otherwise the symbol order is designated by effecting an operation shown in the flowchart of FIG. 10 in which a key corresponding to the pen input operation is pressed to display a screen shown in FIG. 8 on a display part 5.

Figure 10:
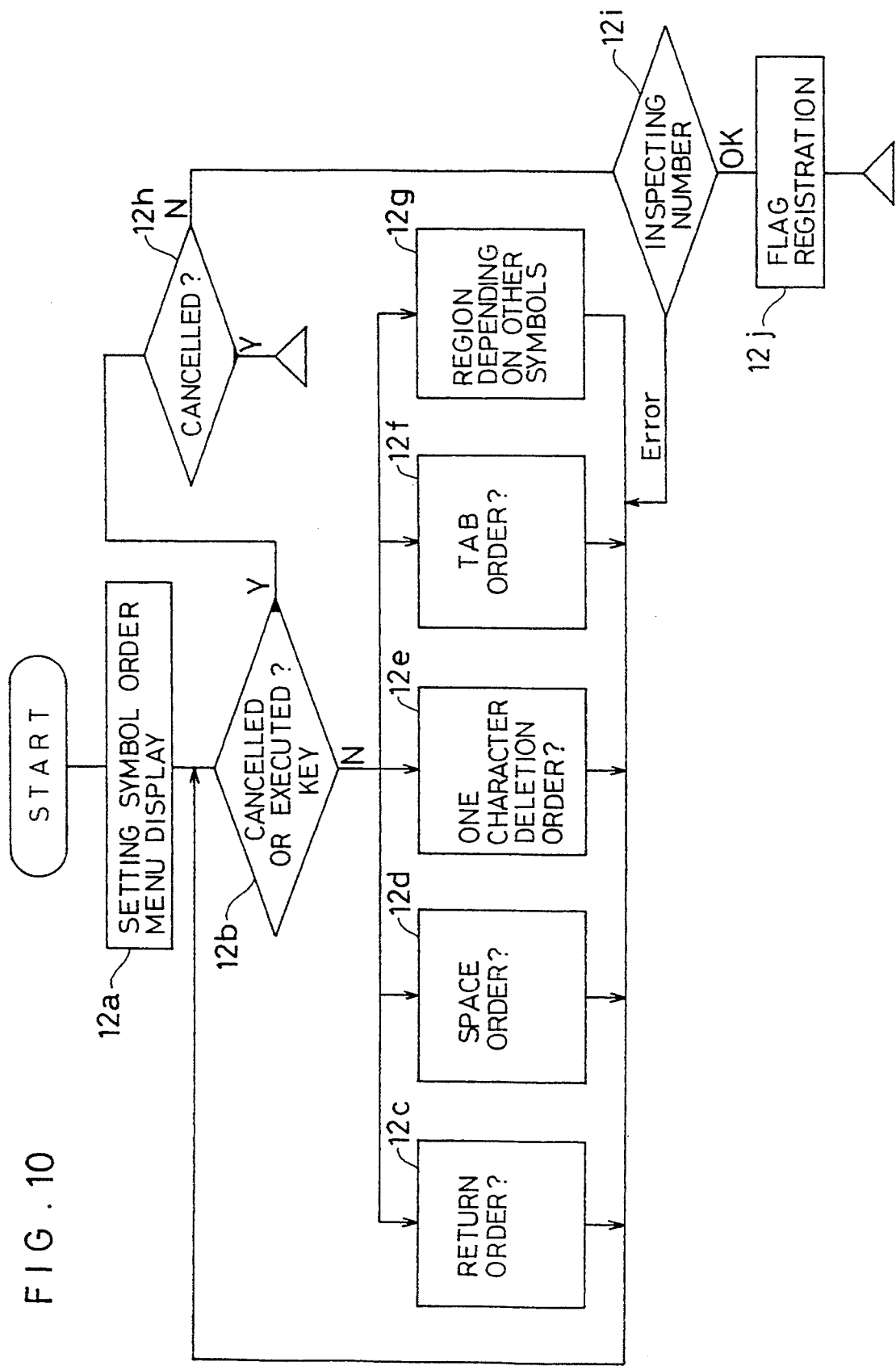
FIG. 10 is a view for illustrating the processing content in setting the order of symbols.

In other words, in the processing shown in FIG. 10, a menu for setting the symbol order of FIG. 8 is displayed (step 12a). The cancel key or the execution key is determined (step 12b), followed by setting the processing order of return (step 12c), space (step 12d), one character deletion (step 12e) and TAB (step 12f). At the same time an operation is effected as to whether the operation for region depends on other operations (step 12g). Then when the cancel key is not pressed (step 12h), the number is checked (step 12i). When the number is correct, each flag is registered (step 12j).

2. Direct Editing Mode and Indirect Editing Mode

The direct editing mode here means a method for consecutive processing performed under the operating system of the conventional personal computer. The indirect editing mode here means a process in which editing symbols are tentatively stored and the symbols are processed in a batch processing mode.

Figure 11A:
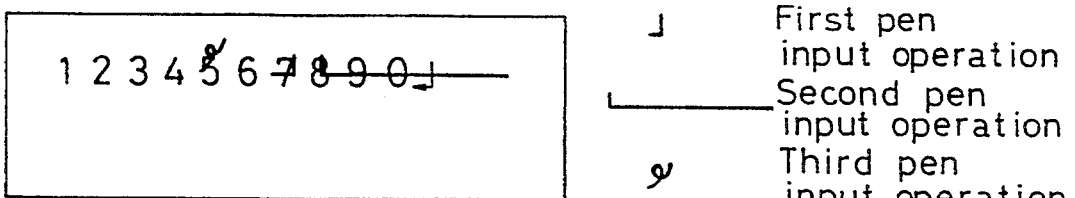
FIGS. 11a through 11d are a view illustrating an example of processing the order of symbols in a batch processing mode.

In other words, in the direct editing mode, as shown in FIGS. 22a through 22f, when an individual editing symbol is entered with the pen input operation, each symbol is recognized and corrected. On the other hand, in the indirect editing mode, as shown in FIG. 11a, when the individual editing symbol is entered with the pen, the editing symbol is tentatively stored in the editing symbol storing memory 18 so that correction processing is performed with the individual editing symbol in the later process.

This mode is selected by determining whether the direct editing is selected or the indirect editing is selected in the screen showing the menu for setting editing symbols shown in FIG. 5. The editing mode flag in the conditional flag region 9 shown in FIG. 4 is set to "0" in the indirect editing and "1" in the direct editing mode.

3. Setting Batch Processing Mode and Individual Processing Mode

Both the batch processing mode and the individual processing mode are similar to the indirect processing mode in which editing symbols tentatively stored are batch processed at one time or they are processed individually.

Figure 11B:
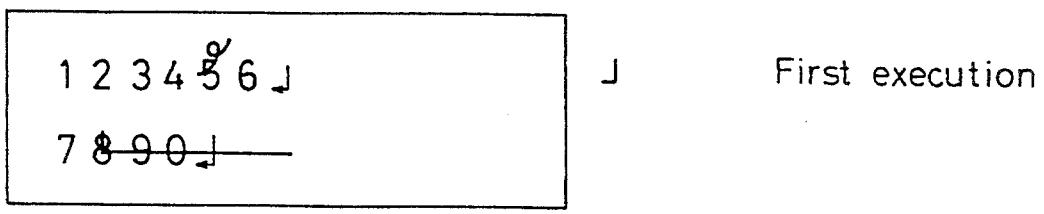
Figure 11C:
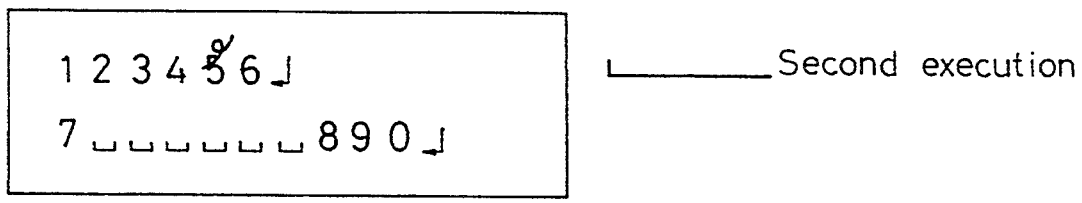
Figure 11D:
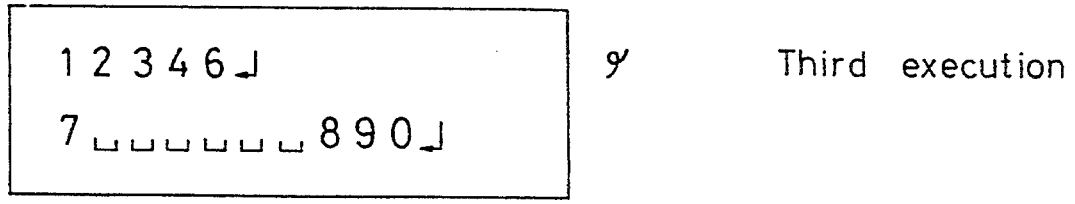

Referring to FIGS. 11a through 11d, the batch processing mode performs processing shown in FIGS. 11b, 11c and 11d successively without interrupting. On the other hand, the individual processing mode interrupts the processing after completing one cycle of processing to confirm the result thereof on the display.

The mode can be determined by selecting either the batch processing mode or the individual mode on the screen showing the menu for setting the editing symbols shown in FIG. 5. The processing mode flag in the conditional flag region 19 shown in FIG. 4 is set to "0" in the batch processing mode or "1" in the individual processing mode.

4. Confirmation of Recognition and Recognition Level

Even in the batch processing mode, the operator is tempted to tentatively interrupt and confirm the processing depending on the kind of the editing symbol. The mode is designated when an individual processing is partially required in the batch processing mode.

This method for setting the recognition level allows determining whether the recognition confirmation is to be set to "required" or "not required" on the screen which shows a menu for setting editing symbols. The recognition confirmation flag in the conditional flag region 19 can be set to "0" in the case of "required" whereas the flag can be set to "1" whereas the same flag can be set to "0" in the case of "not required".

When the flag is set to "required", setting of "continuation", "interruption" or "dependence on others" in each editing symbols set on the menu for setting the recognition level shown in FIG. 7 becomes effective so that individual editing symbols are controlled and executed with the content of each flag on the return level, space level, one character deletion level, TAB level, and region level in the conditional level shown in FIG. 4.

Flags on this recognition level are automatically set to "dependence on others" when the editing symbols gives a complex instruction like region designation. The editing symbol complexes therein determines the content of editing.

5. Setting Reconfirmation Means (Setting Display or Sound)

It is necessary to confirm the editing symbol before executing editing when handwritten symbols are incorrectly recognized. This is a process for setting a method for reconfirmation of the editing symbol. In the process, means is provided which allows an operator to recognize how entered editing symbols are given on the recognition level when the confirmation of recognition either in the individual processing mode or in the batch processing mode is demanded. It is possible to set display or sound as a means for reconfirmation.

Figure 12A:
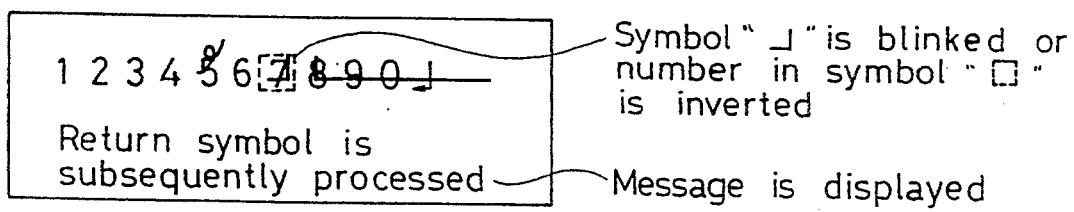
FIGS. 12a and 12b are a view illustrating a representation example of reconfirmation means.
Figure 12B:
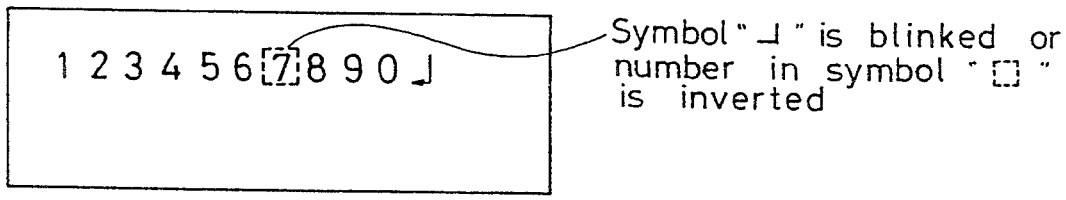

FIGS. 12a and 12b illustrate an example of display by the reconfirmation means in which, after registration of editing symbols shown in FIG. 11a, return of editing symbols is executed. FIG. 12a shows an example of reconfirmation by the display in which after either blinking the editing symbol of return mark or inverting the region where the return mark is located, a message is displayed at the lower portion of the display screen to the effect that a return signal will be subsequently processed.

FIG. 12b is an example of reconfirmation by the sound. Since it is impossible to designate the editing symbol with the sound, the subject symbol in the drawings is either blinked or inverted on the screen. In the place of the message mentioned above, the sound data is output to announce with sound that the return signal will be processed. Such sound data is held in the ROM 2 or RAM 3 shown in FIG. 1 or in the sound generation unit 9 in such a manner that the subject sound data is selected, DA converted at the sound generation unit 9 and transmitted to the sound unit 10.

6. Setting the Order of Processing (Display Order, Symbol Order and Input Order)

The order of processing editing symbols include the display order, the symbol order and the input order. When the processing order is set to the display order, editing processing proceeds from top to bottom of data to be corrected. When the processing order is set to the symbol order, the editing processing proceeds in the order set on the screen for setting the symbol order shown in FIG. 8. When the processing order is set to the input order, the editing processing proceeds in the order of registration numbers shown in FIG. 3 with which editing symbols are controlled.

Suppose the editing processing is set to the input order. When the editing symbols are entered in the order of return, space and one character deletion through the use of a tablet pen 7, the registration numbers corresponding to the editing symbols are registered in the editing symbol storing memory 18. Thus, referring to FIGS. 11a through 11d, the editing processing proceeds in the order shown in FIGS. 11b, 11c and 11d.

Figure 13A:
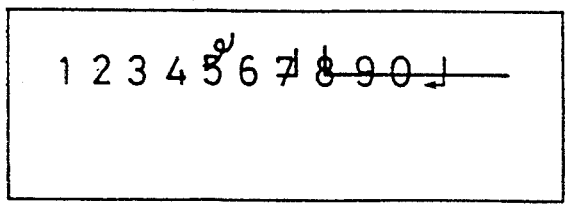
FIGS. 13a through 13d are a view illustrating a processing example of the symbol order in the batch processing mode.
Figure 13B:
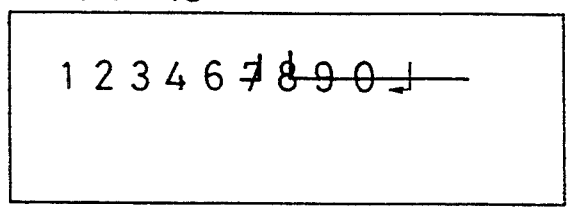
Figure 13C:
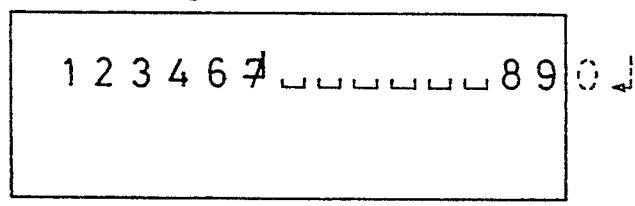
Figure 13D:
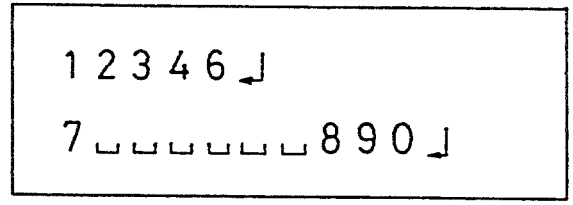

Suppose the editing processing is set to the symbol order. When the order of the editing symbols in the conditional flag region 19 shown in FIG. 4 is set to: one character deletion order=1, space order=2, return order=3, TAB order=4, and region order=0, the editing processing proceeds in the order shown in FIGS. 13b, 13c and 13d irrespective of the order shown in FIG. 13a referring to FIGS. 13a through 13d.

Figure 14A:
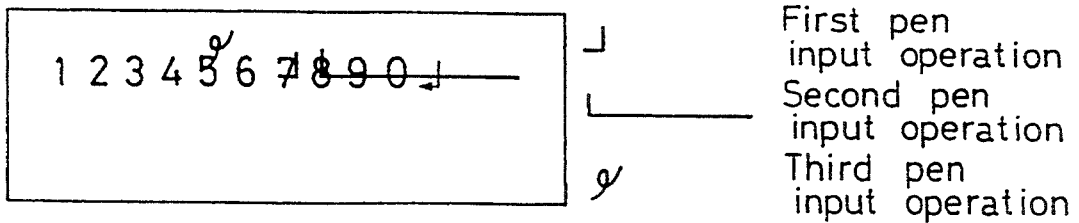
FIGS. 14a through 14d are a view illustrating a processing example of the display order in the batch processing mode.
Figure 14B:
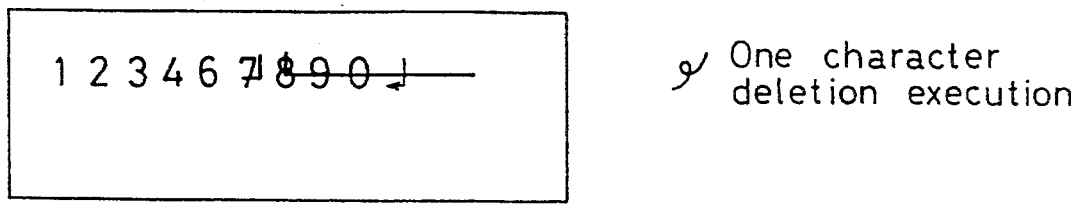
Figure 14C:
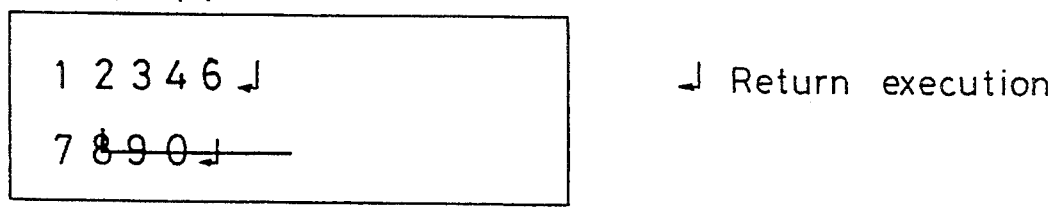
Figure 14D:
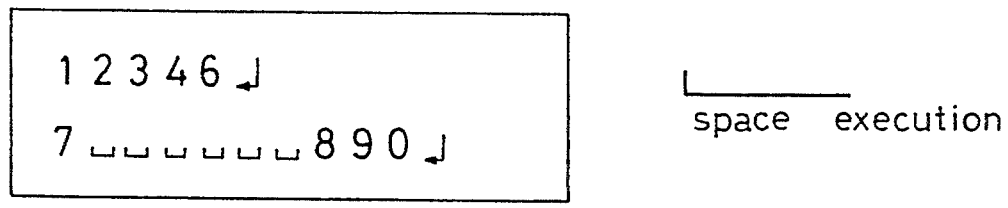

Suppose the editing processing is set to the display order. Referring to FIGS. 14a through 14d, the editing processing proceeds in the order of editing symbols that appears first in the order of the display as shown in FIGS. 14b, 14c and 14d.

In other words, FIGS. 11a through 11d show the editing processing performed in the order of return, space and one character deletion. FIGS. 13a through 13d show the editing processing performed in the order of one character deletion, return and space. The processing order can be determined depending on the purpose as shown here.

The advantage of the input order processing is that since document can be edited in the input order of return, space and one character deletion the process of editing can be easily understood. The advantage of the display order is that, since correction is made successively from the very beginning, when the correction data is large the partial content can be easily understood. The advantage of the symbol order is that since dynamic changes come on the very last stage, deleted parts such as one character deletion can be added after the deletion, so that editing can be made with ease. These can be set very freely in accordance with the situation of each data.

7. Transfer of Editing Symbol

Like the process of editing symbols shown in FIGS. 11a through 11b, in FIGS. 13a through 13d and FIGS. 14a through 14d, the display location of editing symbols to be processed is shifted from the coordinate location entered on the initial stage by the tablet pen 7.

Figure 15:
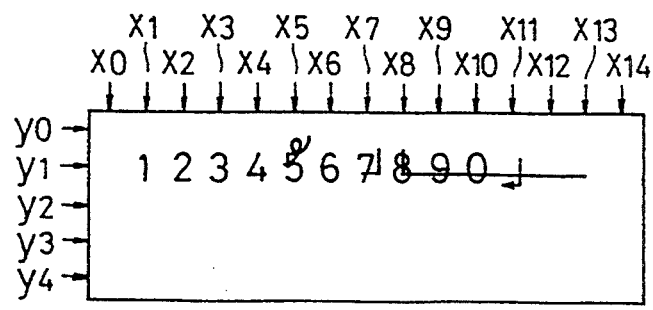
FIG. 15 is a view illustrating coordinate values of entered editing symbols.

Here display examples shown in FIG. 11a and 11b will be discussed. The coordinates of editing symbols shown in FIG. 11a are defined as Xt and Yn as shown in FIG. 15. The editing symbols are registered in the item of the editing scope of the editing symbol storing memory 18 shown in FIG. 3 with the coordinated located at the front position.

For example, with respect to the editing symbol of return, the return symbol shown in FIG. 11a is registered as shown in the editing scope of the editing symbol storing memory 18 so that the return symbol is located at the position of X7 and Y1. In the subsequent process, space and one character deletion symbols are also registered in the same manner.

Then when the return is executed, the position of one character deletion does not change, but the position of the space changes. Thus in this case, the editing symbol of space remains unprocessed so that it is moved as shown in FIG. 11b.

In accordance with this method, since X2 and X3 are produced when a new set of coordinates of the space symbol is read from Xn and Yn, the registration of the front position of the space in the editing scope of FIG. 3 is rewritten from X8, Y1 to X2, Y3. This allows moving the display position of the editing symbol of the space based on this data.

8. Complex Instructions

Complex instructions here means an instruction that does not function all by itself. Such processing as region designation is performed with complex instructions.

The presence of many editing symbols allows creating different kinds of new editing functions such as region deletion (comprising a region designation symbol and a deletion symbol) and region transfer function (comprising a region designation symbol) and a transfer symbol. In this case in determining when the editing function is to be executed, symbols that do not function by themselves such as region designation symbols are allowed to depend on other symbols. In such case the order of processing is controlled so that the processing order is determined by the deletion symbols and transfer symbols. Consequently, the region level and the region order in the conditional flag region 19 as shown in FIG. 4 are controlled and operated as "dependence on others=0".

9. Interruption Processing Before and After Recognition Confirmation

Figure 16:
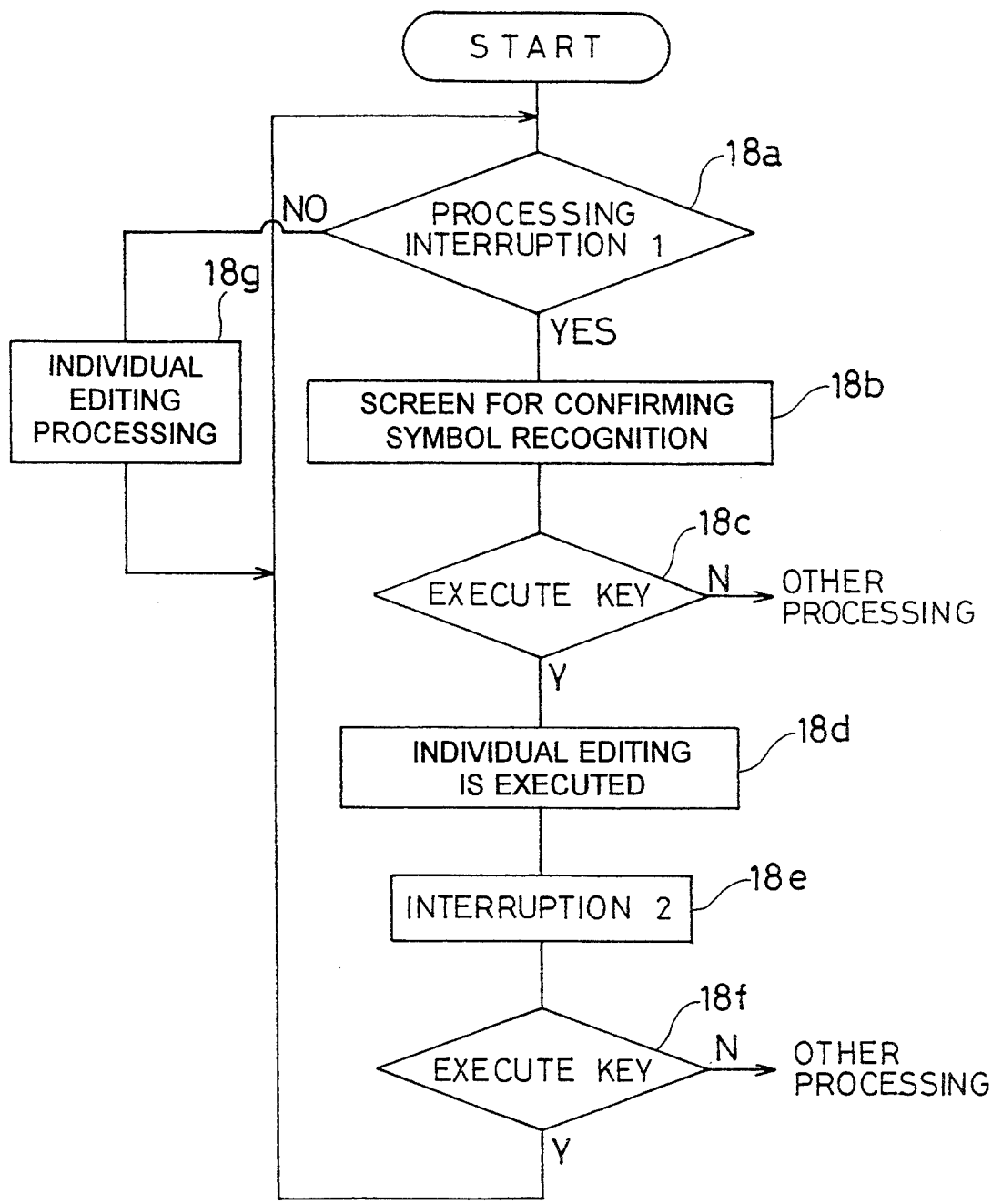
FIG. 16 is a flow chart illustrating a processing content when a recognition confirmation is required in the batch processing mode.

When the recognition confirmation is set to "required" in the batch processing mode, and the recognition confirmation is demanded with respect to part of the editing symbols (symbols whose recognition level is set to "interruption"), the processing is as shown in the flowchart of FIG. 16.

In the processing of FIG. 16, when the mode is set to a batch processing mode and recognition confirmation is required, the processing is interrupted before processing each editing symbol to be processed (step 18a), recognition confirmation screen of editing symbols are displayed (step 18b). When the execution key is pressed (step 18c), the individual editing is executed (step 18b) and the processing is interrupted again (step 18e). Later if the execution key is pressed (step 18f), the processing returns to step 18a, and the processing is interrupted at the subsequent position of editing symbols. Incidentally if the recognition confirmation is not performed at step 18a, recognition confirmation screen of editing symbol is not displayed and the individual editing is executed immediately (step 18g).

In the above processing, when editing symbols which require a recognition confirmation appear successively, pressing down the execution key after interrupting the processing at step 18e produces a recognition confirmation screen again at step 18b. In this case, the content of screen display at step 18e and screen display content at step 18b are fundamentally the same, and the difference lies in whether or not the instruction of the subsequent editing symbol is emphasized and represented.

Figure 17:
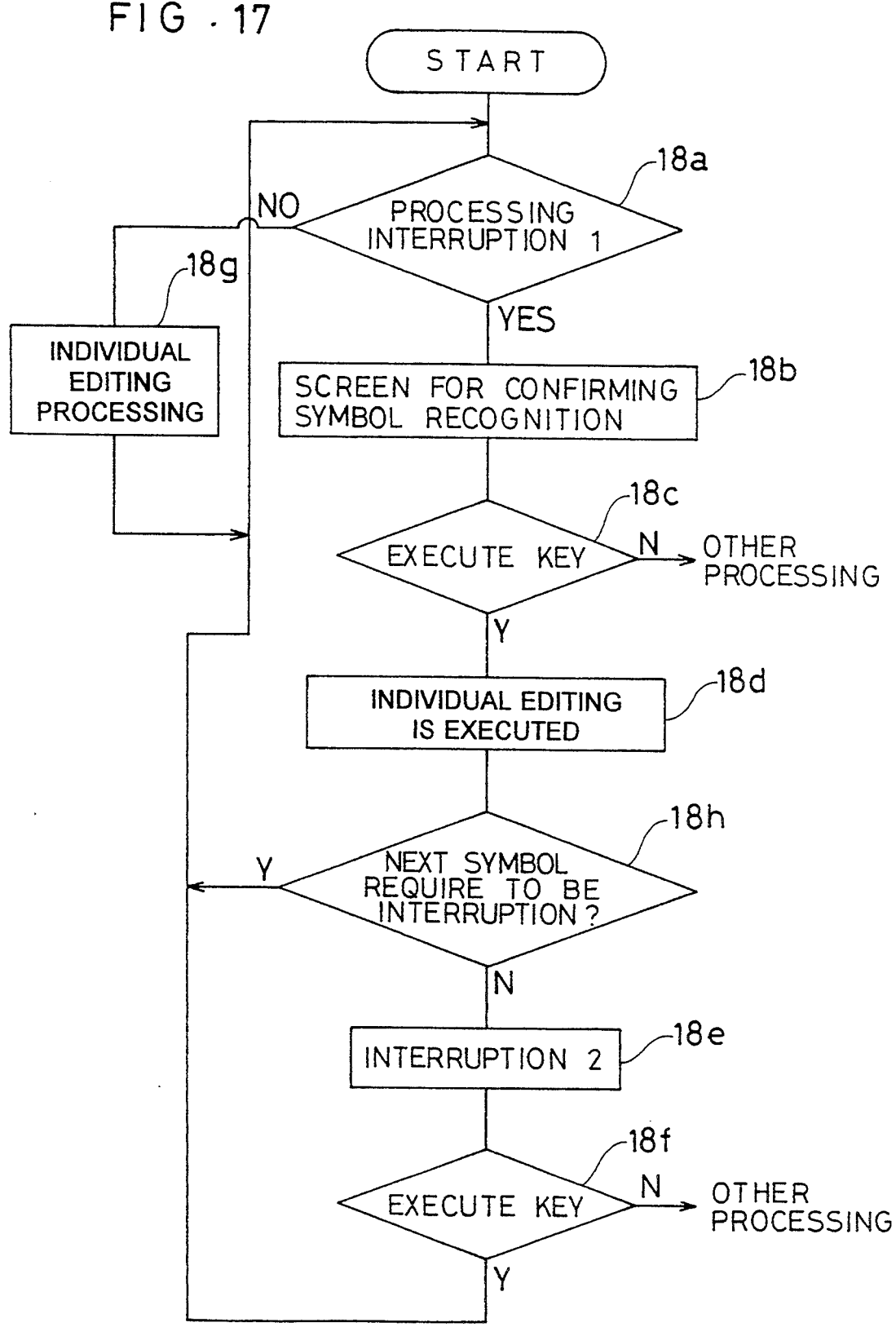
FIG. 17 is a flow chart illustrating the processing content when a determination processing for terminating editing symbols in a flow chart shown in FIG. 16.

Thus, as shown in FIG. 17, step 18h is interposed between step 18d and step 18e in the flowchart of FIG. 16. The processing returns to step 18a without executing the termination at step 18e by confirming in advance the termination of the subsequent editing symbol at step 18h. Thus the operation of the execution key is omitted at step 18f.

10. Overall Operation

Figure 18A:
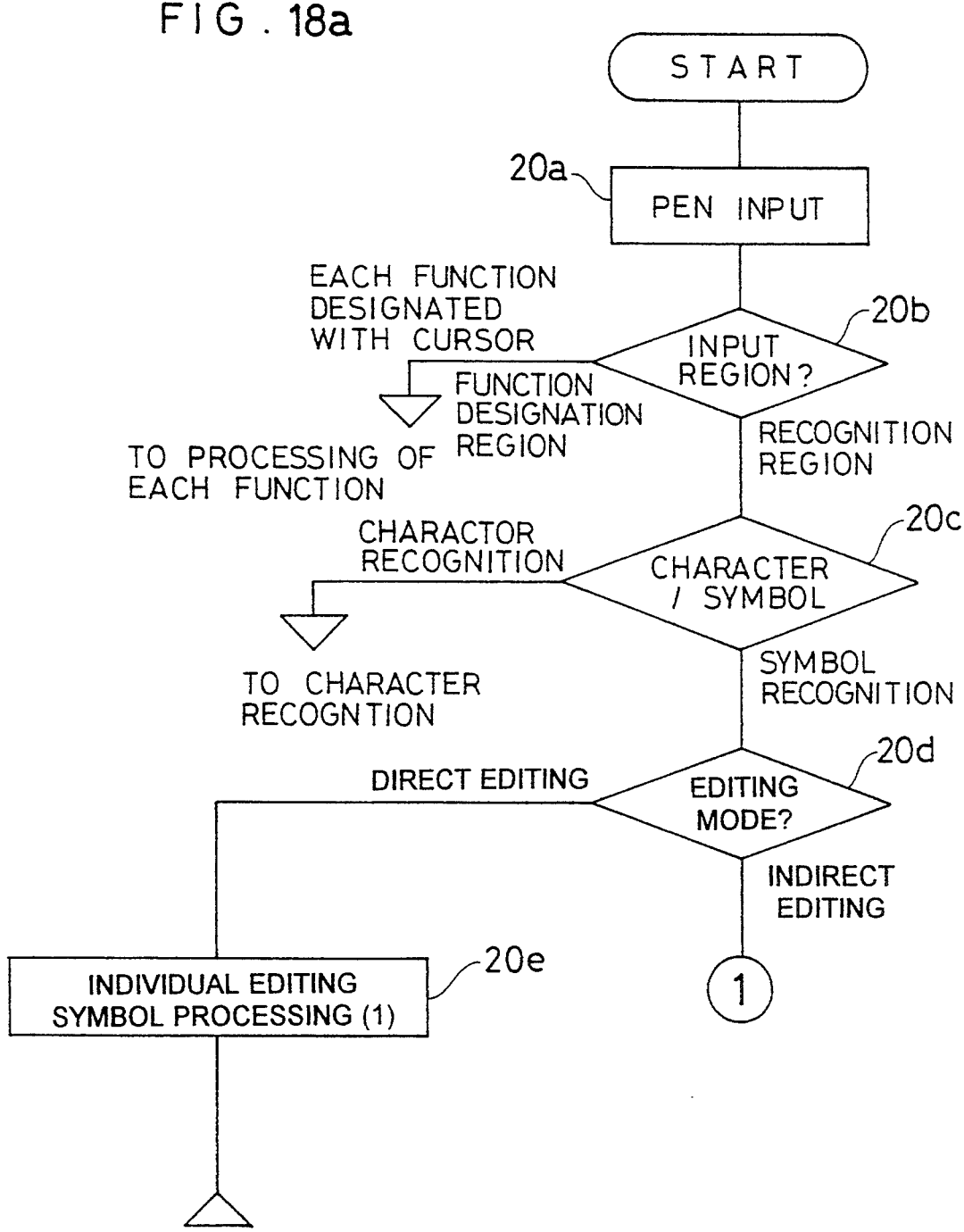

FIGS. 18a and 18b are a flowchart illustrating the overall processing of functions so far mentioned.

In the flowchart of FIGS. 18a and 18b, the pen input operation is performed onto the tablet 6 (step 20a) to designate the handwritten image and the position thereof. When the input region of the pen input is located in a function designation region such as guidance in the display screen (step 20b), each function is performed (not particularly explained here).

In addition, in the recognition region, it is determined whether the recognition is a character recognition or a symbol recognition (step 20c). In the character recognition, it is determined whether or not the editing mode is performed in the direct editing mode or in the indirect editing mode (step 20d). In the direct editing mode, the conventional individual processing of editing symbols (1) is executed (step 20e).

This individual symbol editing processing (1) proceeds while interrupting before and after the process for confirmation (either by display or by sound, as necessary).

At step 20d, the indirect editing mode executes the judgment of the processing mode (step 20f). Here when the batch processing mode is selected, the mode determines whether or not the recognition confirmation is required or not (step 20g). When the recognition confirmation shows "not required", the processing proceeds to step 20h. When the recognition confirmation shows "required", the processing proceeds to step 20i.

At step 20i, the processing is investigated as to whether the recognition level is set to "continuation" or "interruption". When the recognition level is set to "interruption", the processing proceeds to step 20j thereby executing the individual processing of editing symbols (1). On the other hand, when the level is set to "continuation", the processing proceeds to step 20h thereby executing the individual processing of editing symbols (2).

In the recognition level at step 20i, when the recognition level is set to "dependence on others", the operation is executed in accordance with the corresponding symbols. In the determination at step 20f, the individual processing mode executes the executes the individual processing of editing symbols (1).

The individual processing of editing symbols (1) at step 20j is equal to the individual processing of editing symbols (1) at step 20e. The editing operation is interrupted before and after processing one editing symbol or complex symbols complexed with region designation. Each symbol is recognized and confirmed on display or with sound prior to processing the symbol.

The individual processing of editing symbols (1) at step 20h batch processes editing symbols stored in editing symbol storing memory 18 without interrupting the processing or display.

Then after the individual processing of editing symbols (1) or the individual processing of editing symbols (2), it is determined whether or not the processing is the final one or not (step 20k). When the processing is not final, the conditions of the subsequent editing symbols are confirmed again. When the processing is final, the processing is completed.

Incidentally editing symbols are processed in the order set on the screen showing a menu for setting editing symbols shown in FIG. 5.

Figure 19:
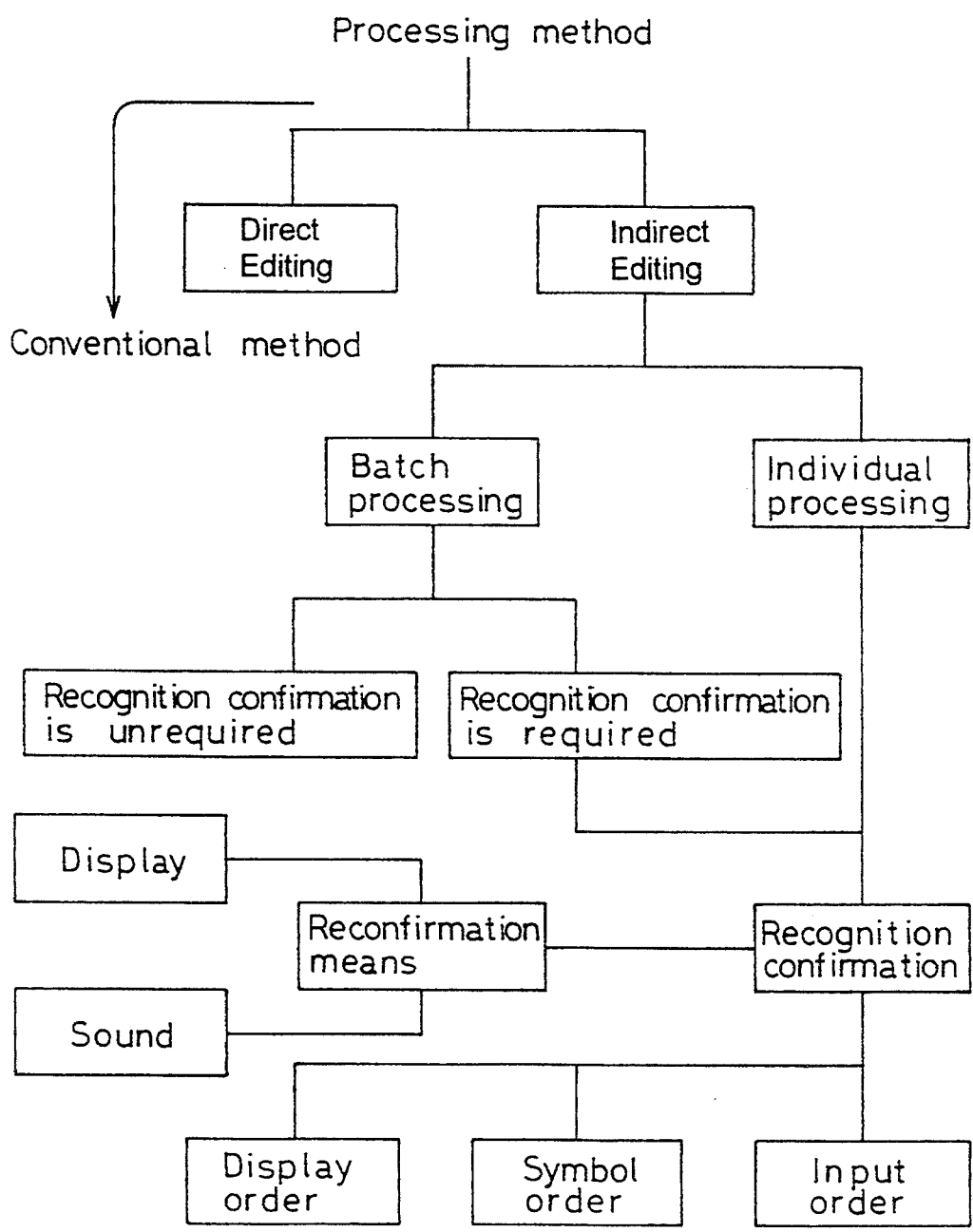
FIG. 19 is a block diagram illustrating the entire processing of the embodiment.
Figure 20:
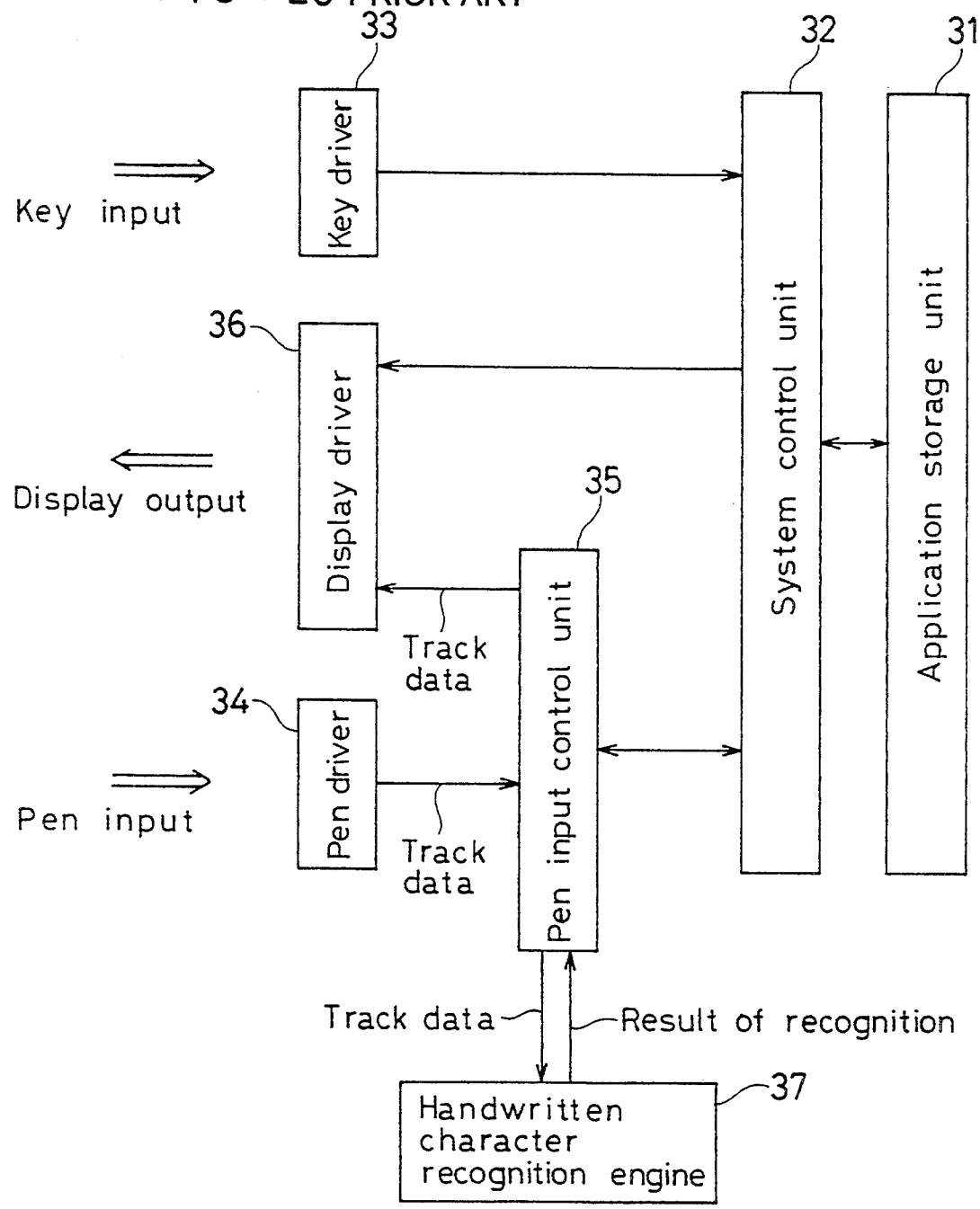
FIG. 20 is a function block diagram of a conventional word processing apparatus of pen input type.
Figure 22A:
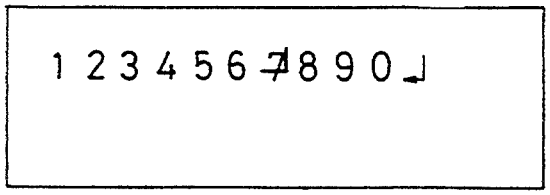
FIGS. 22a through 22f are a view illustrating a processing example by handwriting input.
Figure 22B:
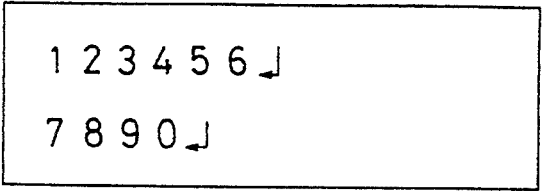
Figure 22C:
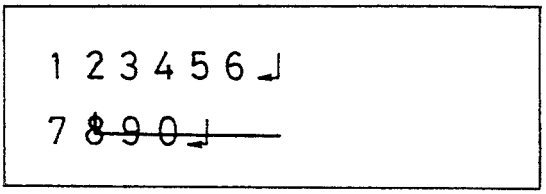
Figure 22D:
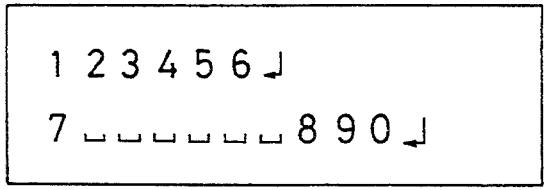
Figure 22E:
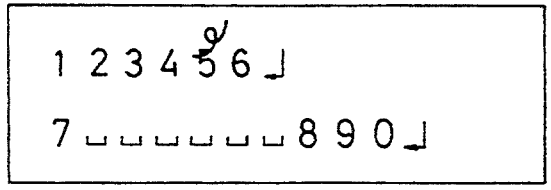
Figure 22F:
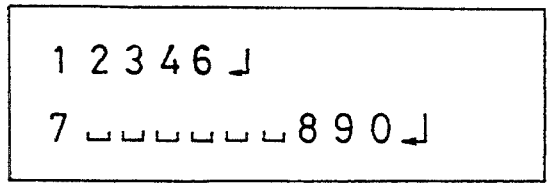

FIG. 19 is a block diagram showing the overall processing mentioned above. The overall editing processing is executed in the form shown hereinbelow.

In this way, an editing symbol storing memory 18 is provided which stores editing symbols by accumulating a plurality of such editing symbols. After confirming the editing symbols entered with the tablet pen, the editing symbol name, the editing scope, and the input image thereof is stored in the editing symbol storing memory 18 as data. Symbols are edited while grasping the process thereof with a technique that facilitates the confirmation. This facilitates the conversion of editing and enables reducing an operation error resulting from a mistaken instruction of editing symbols and a mistaken recognition of editing symbols.

In addition, provision of operation definition means of data accumulated in the editing symbol storing memory 18 enables realizing a diversified operation capabilities.

In accordance with the present invention, after executing all the instruction work for editing, the editing processing can be executed in batches. This enables effectively executing document editing. The operator can designate the batch processing mode and the individual processing mode. Designating the individual processing mode allows the user to determine whether or not the recognized processing is to be actually executed in each processing of editing symbols. This can prevent mistaken operation resulting from mistaken recognition.

When editing processing is executed in batches in accordance with the instruction after completing all the designation work for editing with handwriting input, the processing is interrupted for the time being to allow setting whether or not the editing content is to be confirmed with respect to each processing of editing symbols. This facilitates confirming the content of processing at editing work. When the processing is interrupted for the time being and the editing content is confirmed, the result of recognition of editing symbols are reported to the user. Thus editing processing can be executed while confirming the result of recognition.

When the editing processing is executed in batches after all executing the editing work with handwriting input, the editing processing can be executed in the order desired by the user. Thus this facilitates the confirmation of the editing result. For example, with respect to complex editing symbols, like "region designation", the editing processing can be executed in the order depending on other editing symbols. This facilitates the designation of the editing order.

What is claimed is:

1. A word processing apparatus with a handwriting input function, comprising:
   a data memory for storing data;
   a display screen for displaying the data stored in the data memory;
   a handwriting input tablet for handwriting at least an editing symbol onto a data portion of the displayed data;
   a symbol recognizer for recognizing the handwritten editing symbol by referring to patterns of editing symbols stored therein;
   an editing symbol memory for storing a plurality of editing symbols recognized by the recognizer and their addresses;
   an editing processor which successively edits a plurality of handwritten data portions in accordance with the recognized editing symbols and their addresses;
   an input order memory for storing an input order of the handwritten editing symbols;
   a symbol order memory for storing a predetermined symbol order applied to each editing symbol;
   an address order memory for storing an address order of the editing symbols stored in the editing symbol memory; and
   an order select input device for selecting one specific order from the input order, the predetermined symbol order and the address order, wherein the editing processor edits the handwritten data portions with respect to the editing symbols in responsive to the specific order inputted to the order select input device.

2. A document processing apparatus according to claim 1, wherein the editing processor edits the handwritten data portions with respect to a complex editing symbol which does not have independent function in an order depending on the order of the combined editing symbol.

3. A word processing apparatus with a handwriting input function, comprising:

a data memory for storing data;

a display screen for displaying the data stored in the data memory;

a handwriting input tablet for handwriting at least an editing symbol onto a data portion of the displayed data;

a symbol recognizer for recognizing the handwritten editing symbol by referring to patterns of editing symbols stored therein;

an editing symbol memory for storing a plurality of editing symbols recognized by the recognizer and their addresses;

an editing processor which successively edits a plurality of handwritten data portions in accordance with the recognized editing symbols and their addresses;

an order select input device for selecting one of a plurality of editing order criteria, each of the plurality of editing order criteria specifying a unique ordering for processing editions corresponding to the editing symbols input into the handwriting input tablet;

wherein the editing processor edits the handwritten data portions with respect to the editing symbols in responsive to the editing order criteria inputted to the order select input device.

* * * * *